US006385444B1

(12) United States Patent
Peschel et al.

(10) Patent No.: US 6,385,444 B1
(45) Date of Patent: May 7, 2002

(54) METHOD AND DEVICE FOR CHECKING ACCURACY OF CALL DATA RECORDS IN TELECOMMUNICATIONS SYSTEMS

(75) Inventors: Dietmar Peschel, Bonn; Stefan Anderlohr, Lohmar-Heide; Mark Schonfeld, Haan, all of (DE); Jean-Pierre Jacot, Hubersdorf; Martin Schenker, Solothurn, both of (CH)

(73) Assignees: DeTeMobil Deutsche Telekom MobilNet GmbH, Bonn (DE); Ascom Infrasys AG, Solothurn (CH)

( * ) Notice: Subject to any disclaimer, the term of this patent is extended or adjusted under 35 U.S.C. 154(b) by 0 days.

(21) Appl. No.: 09/297,368
(22) PCT Filed: Oct. 14, 1997
(86) PCT No.: PCT/EP97/05644
  § 371 Date: Aug. 3, 1999
  § 102(e) Date: Aug. 3, 1999
(87) PCT Pub. No.: WO98/19469
  PCT Pub. Date: May 7, 1998

(30) Foreign Application Priority Data

Oct. 31, 1996 (DE) .......................................... 196 44 024

(51) Int. Cl.[7] ............................................. H04M 11/08
(52) U.S. Cl. ........................ 455/405; 455/405; 455/406; 455/404
(58) Field of Search ................................ 455/405, 412, 455/414, 415, 416, 445, 406, 407, 408, 409; 379/111, 116, 119, 126, 133, 135, 115, 130, 121

(56) References Cited

U.S. PATENT DOCUMENTS

| 5,659,601 A | * | 8/1997 | Cheslog | 455/406 |
| 5,706,330 A | * | 1/1998 | Bufferd | 379/58 |
| 5,835,856 A | * | 11/1998 | Patel | 455/406 |
| 5,907,800 A | * | 5/1999 | Johnson | 455/405 |
| 6,052,448 A | * | 4/2000 | Janning | 379/114 |
| 6,252,951 B1 | * | 6/2001 | Alcott | 379/114 |
| 6,324,404 B1 | * | 11/2001 | Dennison | 455/456 |

* cited by examiner

Primary Examiner—Daniel Hunter
Assistant Examiner—Khawar Iqbal
(74) Attorney, Agent, or Firm—Browdy and Neimark

(57) ABSTRACT

A method and device for checking a telecommunication system (4) with respect to an accurate routine detection of system-internal call data records (13, 14). Various communications connections are established and later terminated between two subscriber stations (2,3) via the telecommunication system (4) on the basis of predefined communication parameters; further call data records (10a,10b) are independently prepared and saved from these communications connections at both of these subscriber stations (2,3); and the system-internal call data records (101013) for said communications connections that are routinely created by the telecommunications system (4) itself, are compared to the further call data records (10a, 10b).

24 Claims, 8 Drawing Sheets

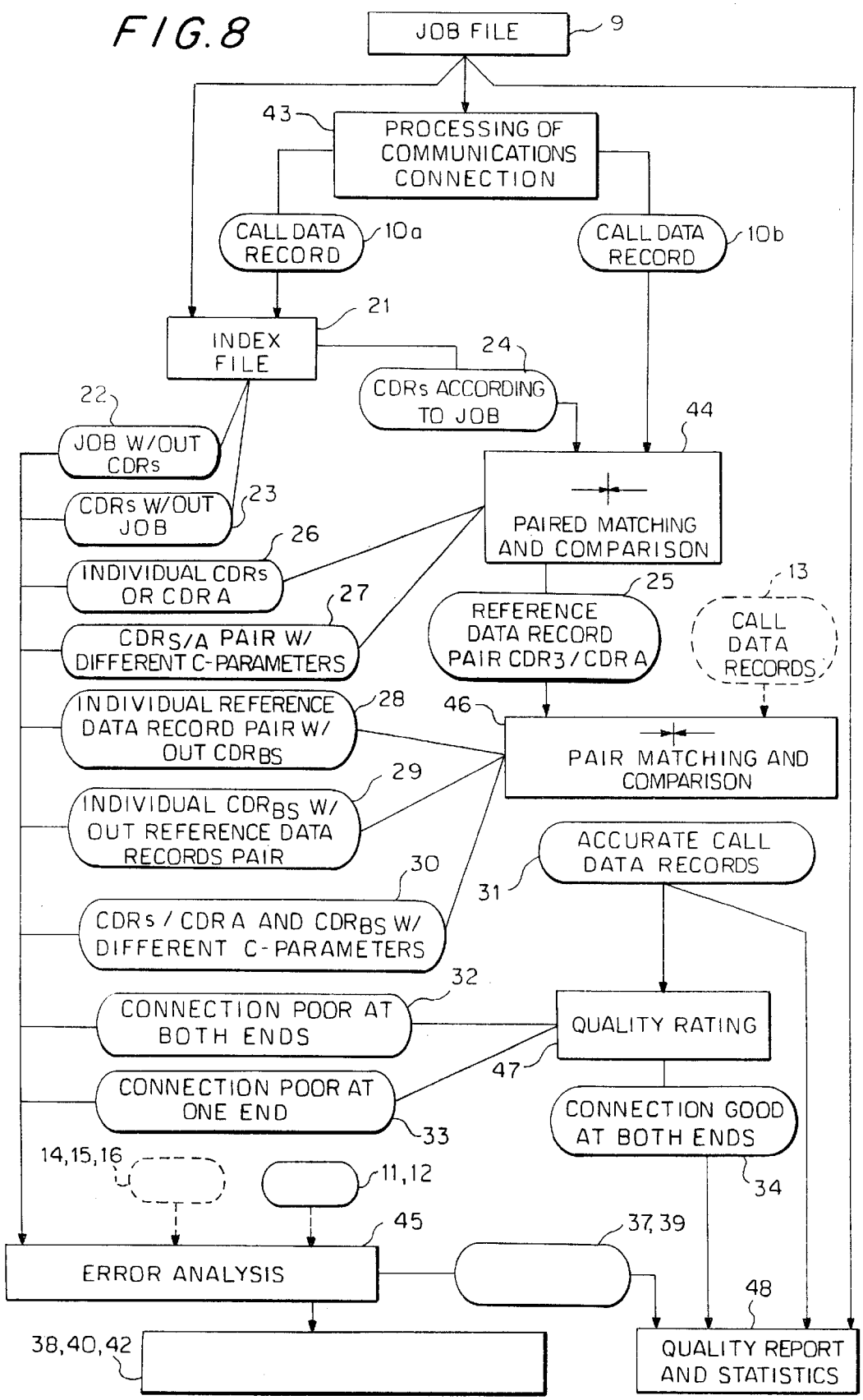

METHOD AND DEVICE FOR CHECKING ACCURACY OF CALL DATA RECORDS IN TELECOMMUNICATIONS SYSTEMS

CROSS REFERENCE TO RELATED APPLICATION

The present application is the national stage under 35 U.S.C. 371 of PCT/EP97/05644, filed Oct. 14, 1997.

The invention relates to a method and device for checking whether call data records in telecommunication systems have been created correctly and fully, specifically in mobile telephony networks, including the review of the data basis in the billing system, which is used to bill for the usage of the communications service.

Ragnar Huslende, in the printed publication ERICSSON Review, Vol. 72, No. 1, 1995, Stockholm, SE, pages 13–21, has described a way of measuring quality in public telecommunication networks. It is proposed that a number of review units be arranged in the telecommunication networks, which act like normal subscriber units and communicate with each other automatically via the network. During the communications connection, quality parameters, e.g., signal/noise distance are measured and routed to a central station where they are analyzed.

A similar method has also become known from the magazine TEC, Das technische Magazin von Ascom, 3/95, Bern, CH, pages 30–34, in an article by Heinz Lüthi. The article also proposes that communications connections, specifically voice connections, be established in a communications network via automated review stations, and that the respective voice quality of the review connections be analyzed and evaluated. The evaluation of the voice quality takes place with the use of neural diagnosis technology.

The present invention relates less to the review of the voice quality of a communications connection but rather to reviewing sets of communications data. Call data records are generated, saved and used to prepare the billing files in every telecommunication network. In digital mobile telephony networks, for example, these call data records are generated and saved in the mobile switching centers (MSC) and forwarded to a billing center, where the billing is handled jointly for all mobile telephony subscribers.

The creation of the call data records at the switching centers is purely software-driven and controlled via corresponding software parameters. Errors in the software and/or hardware and/or incorrectly adjusted software parameters can lead to malfunctions in the creation of the call data records, with the result that incomplete or defective call data records are created, or no call data records are created at all. If errors occur, they are usually identified only very late because the review of the call data records for correctness has so far been possible only in the form of spot checks, only for portions of the telecommunication network, and with a great deal of manual work.

It is in the interest of the customer and the operating company that the call data records are created correctly and that a correct billing takes place.

It is, therefore, the object of the invention to propose a method and device for checking whether call data records in a telecommunication system, or intercommunicatively in a plurality of telecommunication systems, have been created correctly and fully, whereby the accurate creation of call data records is reviewed permanently and automatically.

This object is met with a method according to the technical teaching of claim 1 and a device according to claim 23.

It is the principal feature of the invention that communications connections, which are oriented at the customer behavior or predefined by the operating company, are performed in the telecommunication network which is being reviewed by means of an automatic review system, in such a way that the communication parameters are recorded independently from each other and independently from the network, both at the calling station and at the called station. The call data records and billing data that are recorded by the telecommunication network itself are subsequently verified based on the reference data recorded by the review system. The special feature is that the reference data required for the verification are created by the system itself. These reference data are 100% qualitatively verified pairs of real call data records. The review encompasses all billing-relevant parameters, which are, among others:

Date,
Start time/end time of the call,
Duration of the call,
Location of the call, origin of the call,
Call destination, destination telephone number,
Utilized telecommunication service.

The review of the telecommunication network is performed during active operation, i.e., checking whether call data records are created correctly takes place under operating conditions. All elements of the telecommunication network are included, from the customer interface, the telecommunication end unit to the data basis in the telecommunication system's billing system, which (for billing purposes) contains all billing-relevant call data records. It is also possible to check individual segments of the telecommunication network. The method is intended to provide the following functions:

Verification of telecommunication connections

The review system can be used to verify that a corresponding telecommunication connection did exist. The connection parameters are recorded both at the calling party and at the caller's, and a check is performed whether a corresponding call data record for this connection was recorded in the telecommunication network itself. Both, end-to-end communications connections (customer interface to customer interface) as well as connections between any partial segments of the communications system (customer interface to operating company interface, or operating company interface to operating company interface) are reviewed.

Verification of call data records

The call data records that are created by the review system, in the following also referred to as reference data records, are compared to the call data records created by the telecommunication network.

Verification of the usability of the telecommunication connection

A determination is made, via the review system, to which extent a telecommunication connection was usable. During the review connection, review information is transmitted from both, the calling party and the called party to the respective opposite station. The review system determines the utilization of the telecommunication connection based on the received review information.

The advantage of the system according to the invention lies in the fact that a review of the call data records can now be performed automatically and permanently. The review can extend across one or multiple telecommunication networks.

It is furthermore possible to perform a cause-oriented error analysis for defective call data records based on the recorded network signaling data.

The method and device are explained in detail below, based on the example of a mobile telephony network. The method essentially comprises 5 process areas:

1. Creation of the customer-behavior oriented or operating-company oriented review scenarios for the call data records,
2. Generation of reference data records,
3. Generation of call data records by the telecommunication system,
4. Review of the telecommunication system's call data records based on the reference data records, and review of the usability of the telecommunication connection,
5. Adaptation of the customer-behavior oriented or operating-company oriented call data record review scenarios, based on the indications of errors and error/cause analysis of the defective call data records.

1. Creation of customer-behavior oriented or operating-company oriented review scenarios for the call data records:

In order for the review of the call data records of the mobile telephony network to cover, to the fullest extent possible, the scope of services as they are also used by customers, a review scenario must be created that resembles the customer behavior. A statistically representative, anonymized customer call data record profile of, e.g., 10,000 data records is, therefore, generated from all customer-generated call data records of the active mobile telephony network, both with and without billing relevance. From these 10,000 data records, the review scenarios for the call data records are generated according to the following method:

The 10,000 data records are sorted in chronological order.

A review file (start time $t_1$, end time $t_{end}$) is defined. In the customer call data record profile, a search is performed for a data record with this predefined start time $t_1$, e.g., Tuesday, 8:00 A.M. The parameters of this call data record (e.g., start of call, duration of call, communications service, call destination area, call origin area) are incorporated into the review file as data record 1.

The call duration t of data record 1, the system time $t_{system}$, and $t_1$ are used to determine the start time $t_2$ of the second data record.

In the customer call data record profile, a search is now performed for a data record with the start time $t_2$.

The parameters of the data record selected in this manner are in turn incorporated into the review file as data record 2. This is repeated until the desired review package has been created, or until the pre-defined end time $t_{end}$ has been reached.

With this method, a customer-behavior oriented review profile is created, which quasi corresponds to a cumulated "real" customer behavior. Since a review profile of this type can be permanently recreated, e.g., on a daily or weekly basis, changes in the customer behavior are directly reflected in the review profile because the customer call data record profile is always based on real call data records. In addition to the review package with customer-behavior oriented call data records, review packages can also be created with operating-company oriented call data records. With the operating-company oriented call data records, the call parameters are freely determined by the operating company. The review packages may also be created as mixed packages, from customer-behavior oriented and operating-company oriented call data records.

2. Creation of reference data records

To be able to make a statement regarding the quality of the complete communication data chain and billing-relevant production chain of a telecommunication network/system, the call data records created in the telecommunication system must be checked for their completeness and accuracy. Telephone calls made by customers cannot be used for this purpose. This is prohibited, on one hand, by data privacy regulations, and other the other hand—which is a significant inaccuracy factor in the review of the quality—no original data are available, such as what the customer really entered at his end unit, and when, how long, where to, etc.

To be able to conclusively evaluate the billing data at the end of the production chain, reference data records are created. This is done as follows:

From a system-internal sending station, connections to a system-internal answering station are established automatically via the telecommunication network being reviewed according to the review scenario defined and firmly established under Section 1 above, and terminated after specific call durations, which are defined in the review file. During the connection, review information is exchanged between the sending station and the answering station, and receipt of this information is rated and logged by both stations.

Both the sending station and the answering station can be operated as a stationary or mobile station.

At both stations, the sending station and the answering station, call data records are created and saved independently from each other, based on the actual connection parameters. Furthermore, the signaling data (e.g., Layer 2 and Layer 3) that are exchanged via the telecommunication system are logged in log files at the sending station and the answering station, respectively. These signaling data, as well as the review results from the exchange of the review information, which are also recorded in log files, are called up by the management system as needed (in the case of an error/cause analysis). A summary of the review results from each individual connection is incorporated into the call data record by both the sending station and the answering station as a quality parameter. The call data records are subsequently transmitted to a central management system, matched and compared to one another. Only call data records whose communication parameters are 100% identical are later used as reference data records for the verification of the call data records generated by the network. The defective data records are saved in files and routed to a cause-oriented automated or manual error analysis. With this method, reference data records are created for the review of the communication data from the telecommunication system, which are based on actual telephone connections, which are 100% complete and accurate, and whose call parameters are known conclusively.

3. Generation of call data records by the telecommunication system

From the sending station, connections are established to the answering station via the mobile telephony network. The network-internal call data records created at the switching centers (MSC) are transmitted to the central billing center (Data Post-Processing System, DPPS), where the call data records are available in a defined format for further transmitting to the management system.

4. Review of the telecommunication system's call data records based on the reference data records, and review of the usability of the telecommunication connection:

The review of the telecommunication system's call data records based on the reference data records takes place at the management system. For this purpose the call data records from the billing center are transmitted to the management system, where they are matched to the reference data record pairs (see section 2 "Creation of reference data records") that are available at the management system, and compared to same to determine whether their communication parameters are identical. If the call data records do not match the reference data record pairs, they are saved in files, which are routed to an automatic and manual error analysis. In the automatic error analysis, the data records are split into error groups with the same error patterns and saved in error collectors. In a second step, the data records from individual error collectors are subjected to a manual error analysis.

5. Adaptation of the customer-behavior oriented or operating-company oriented call data record review scenarios based on the error indicators and error/cause analysis of the defective call data records.

The review scenarios for the telecommunication system's call data records are supplemented or modified based on the data records saved in the error collectors. Review files are now created in a concentrated effort, whose parameters correspond to the job files that have led to the errors found during the review of the telecommunication network's call data records. This specifically increases the likelihood that additional indicators for error checking and correction will become apparent.

For the error/cause analysis and recognition, the defective call data records and the corresponding signaling and connection data logged by the sending/answering stations and the mobile telephony devices, along with the logged results from the review information exchange between the stations, are routed to the management system where they are analyzed.

The invention is explained in detail below, based on drawings, which show only one possible embodiment. Additional characteristics that are essential for the invention, and advantages of the invention will become apparent from the drawings and their description. In the drawings:

FIG. 8 is a flow chart of the quality review of the call data records.

Figure 1:
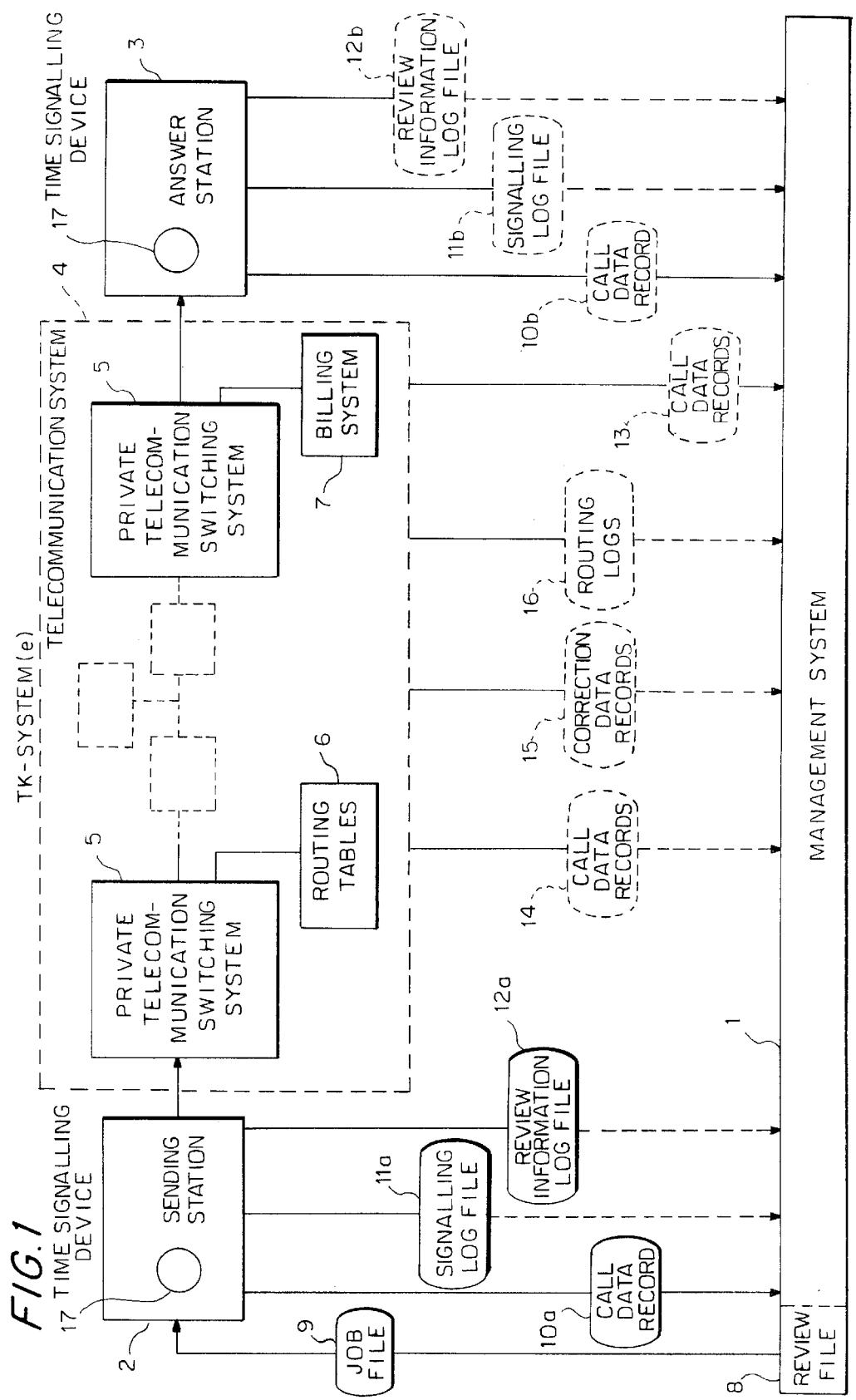
FIG. 1 shows a schematic view of the review structure according to the invention.

FIG. 1 presents an overview of the principle of the review structure.

The illustration shows the review system, which comprises a management system 1, sending station 2 and answering station 3, as well as the telecommunication system 4 to be reviewed. The telecommunication system 4 may comprise one or a plurality of private telecommunication switching systems $TC_1$ through $TC_n$, 5, or telecommunication networks with features such as routing tables 6 and a billing system 7.

The management system 1 creates a review block from the generated review files 8 and sends this review block to the sending station 2 (e.g., via GSM or ISDN) as a job file 9.

The review/job files 8,9 contain, among others, information regarding: telephone number of the sending station; telephone number of the answering station; date, start time and end time or duration of the call; communications service; review mode; identification index.

The sending station 2 processes the job file 9 in such a way that it establishes communications with the answering station 3 defined in the file, using the communication parameters defined in the file. The resulting details are described more closely in FIGS. 3 through 8.

During the established connection, call data records (CDR) 10a, 10b, signaling log files 11a, 11b, as well as review information log files 12a,12b are recorded, both at the sending station 2 and the answering station 3. In the telecommunication system 4, call data records 13, 14, connection data logs 15, routing logs 16, etc. are also saved at various elements of the system. The data logs 10, 13, log files 11, 12, logs 16, etc., that are recorded in the telecommunication system 4 and at the sending 2 and answering station 3, are transmitted to the management system 1 or called up by the management system as needed (e.g., via GSM or ISDN), where they are matched and compared, and where defective data records are analyzed based on the log files and logs.

The sending station 2 and the answering station 3 are synchronized by means of a time signaling device 17 (e.g., DCF77). Both stations 2,3 may be mobile stations, for example, or stationary stations.

Figure 2:
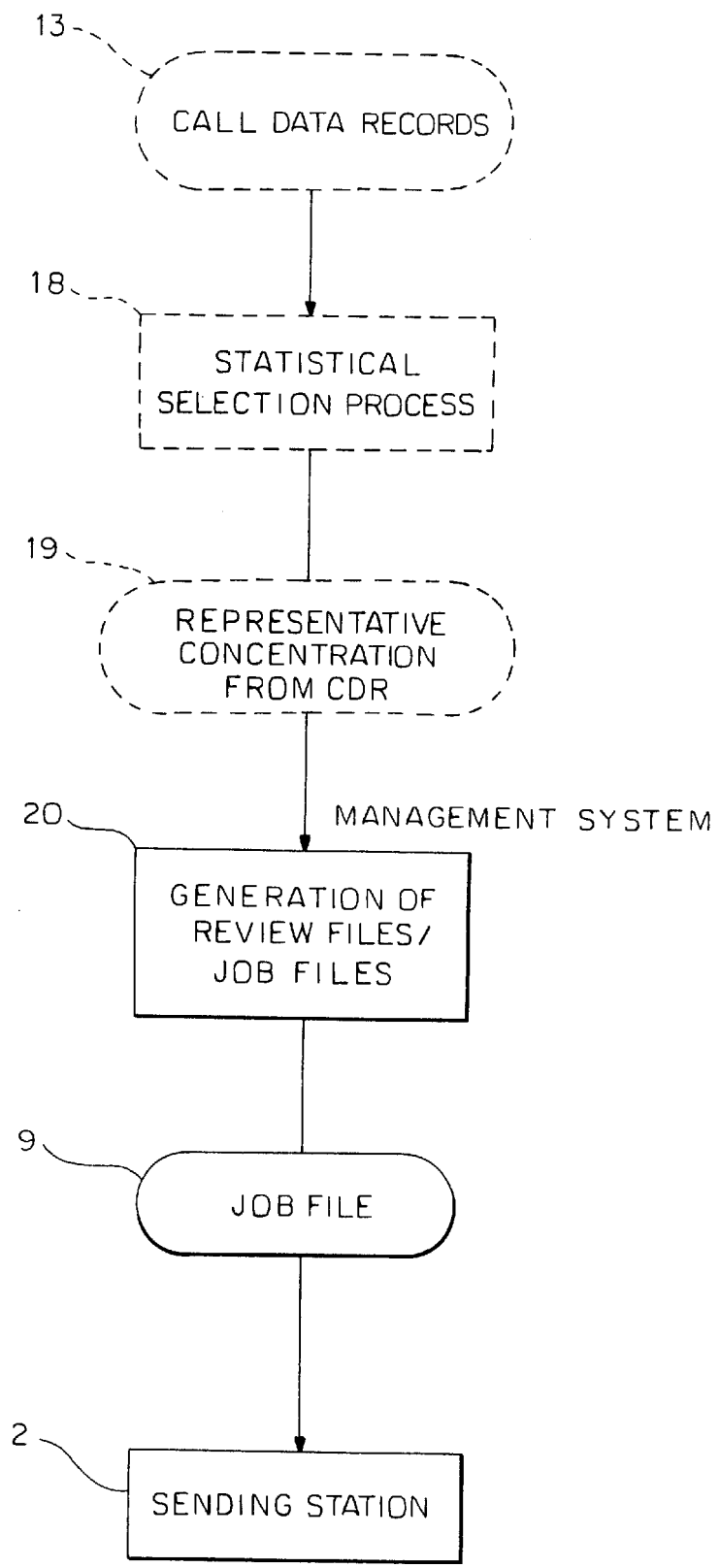
FIG. 2 shows the creation of customer-behavior oriented job files of the call data records.

FIG. 2 illustrates the job definition, i.e., the creation of the job file 9 for the sending station. Real customer call data records 13 are selected from the database of the telecommunication system 4 (e.g., call data records from the billing system $CDR_{BS}$) according to a statistical selection process, for example in such a way that the $CDR_{BS}$ are sorted by their date and start time, and every $10,000^{th}$ $CDR_{BS}$ is subsequently copied in an anonymized form.

In the next step, the representative call data record concentrate 13 obtained in this manner is routed to the management system 1.

At the management system 1, review files 20 are generated, which consist of communications jobs whose communication parameters, such as start time of the communication, end time or duration of the communication, location of the communication (e.g., originating cell in the mobile telephony network), communications origin/destination area (e.g., mobile telephony network, fixed network, local exchange area, remote area) and communications service are identical to the "real" customer call data records. System or review-specific parameters are then added to the review file 20, such as destination address of the sending station 2, review mode, identification index, and grouped collision-free into review blocks, under optimum utilization of the sending 2 and answering stations 3 available to the review system. These review blocks are subsequently distributed as job files 9 to the sending stations 2 (transmission e.g., via GSM or ISDN).

Figure 3:
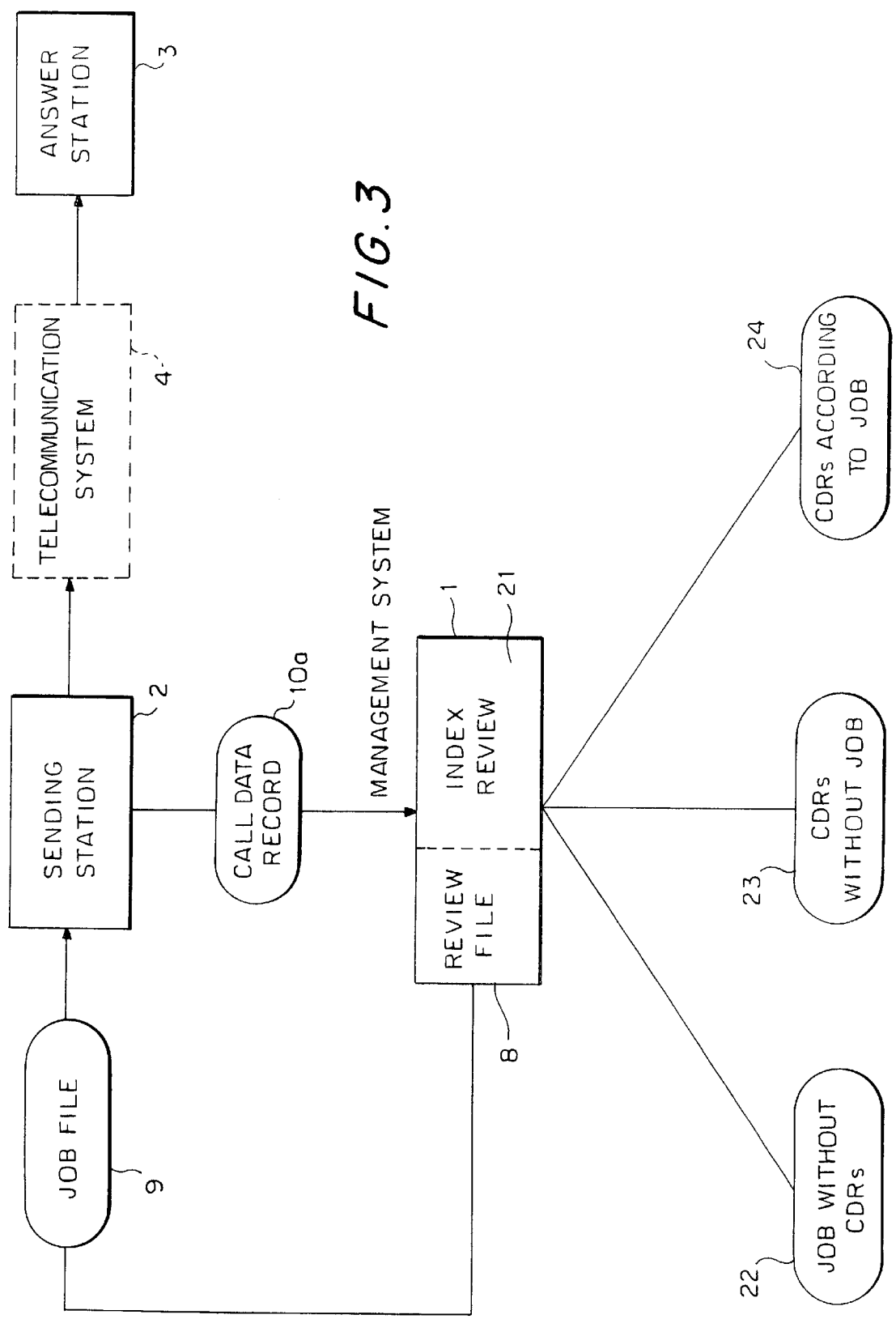
FIG. 3 illustrates the index review between job file and call data record of the sending station CDRs.
Figure 4:
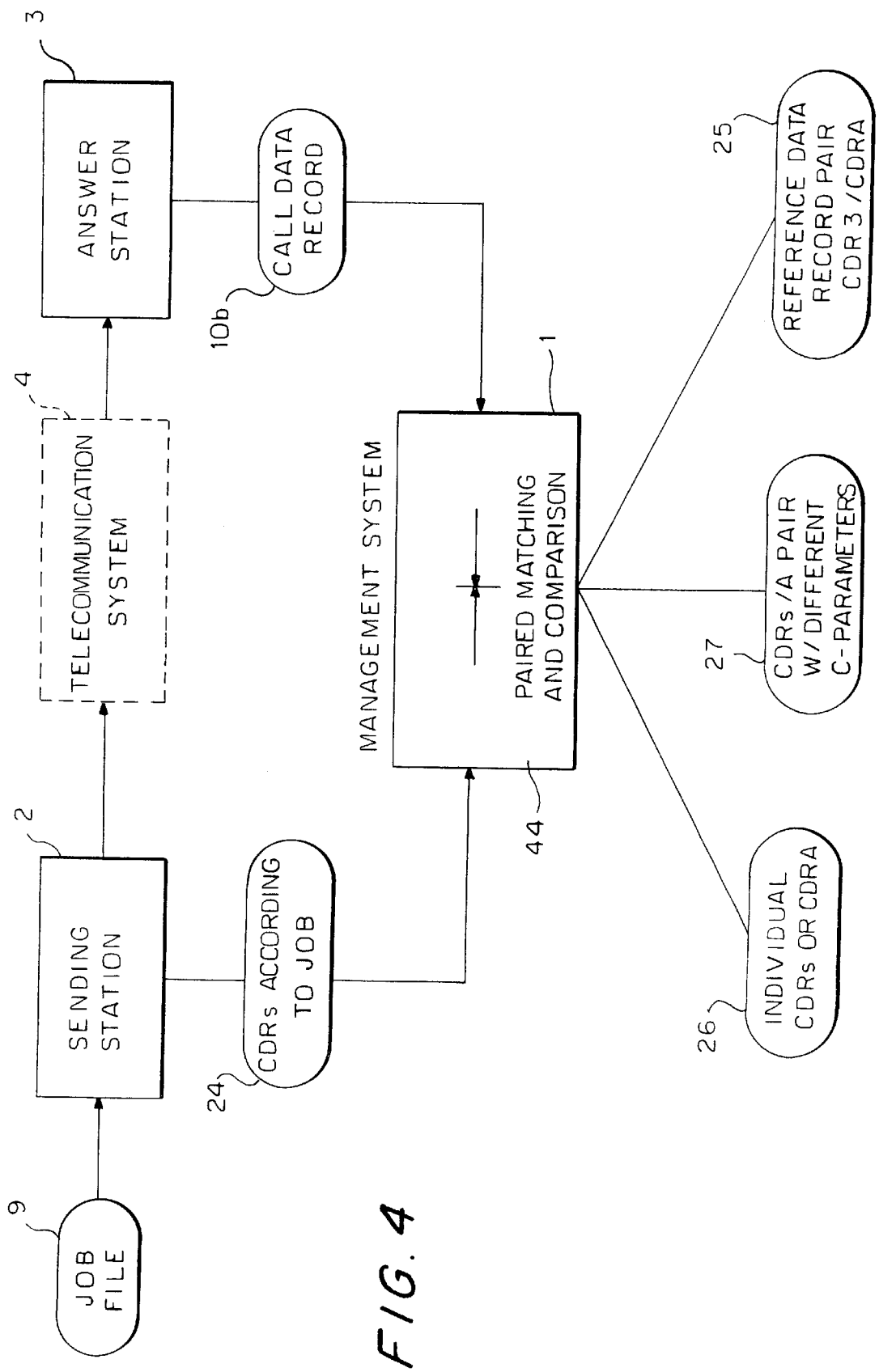
FIG. 4 shows the creation of reference data record pairs.

At the sending station 2, the job file 9 is received, saved and executed in accordance with the defined communications and review parameters (see FIG. 3 and 4 for details).

FIG. 3 illustrates the index review 21 between the review file 8 and the call data record 10a from the sending station 2.

At the sending station 2, the review files 8 received from the management system 1 are executed according to the parameters defined therein. For this purpose a defined communications connection is established by the sending station 2 at the predefined time via the telecommunication system 4, TC system, to the answering station 3, which is also predefined. After the duration of the communication as defined in the review file 8, the connection is terminated with precise timing. Set-up of the connection is automated, i.e., the sending and answering station 2,3 incorporate a computer that controls and records the set-up and termination of the connection. A call data record 10a,10a for the established connection is created both at the sending 2 and at the answering station 3, saved, and transmitted to the management system 1 during pauses in the review. For a conclusive identification, the index of the job file 9 (e.g., telephone number of the sending station, date and item number) is transmitted into the call data record 10a ($CDR_S$) by the sending station 2.

The telephone number of the sending/answering station; the date; the start time/end time or duration of the call; the communications service; review mode, index and quality parameters of the connection; as well as some network-specific data (cell identification, network identification, etc.) are furthermore added to the call data record 10a ($CDR_S$). At the management system 1, the call data record 10a ($CDR_S$) created by the sending station 2 and transmitted to the management system 1, and the job file 9 are subjected to an automated matching and review for identity of their indices (21).

The result of this review are 3 types of data:
  Job without $CDR_S$ (22), and
  $CDR_S$ without job (23),
which are routed to a further error analysis at the management system 1 (see FIGS. 7 and 8), and "$CDR_S$ according to job" (24), which are used for further billing verification (see FIG. 4).

FIG. 4 shows the creation of reference data record pairs (25). In this process, pairs of call data records $CDR_S/CDR_A$ are formed from the "$CDR_S$ according to job" (24) selected according to FIG. 3 and the call data records (10b) from the answering station 3 ($CDR_A$).

At the answering station 3, a call data record 10b is created and saved for each established communications connection according to the same principle as at the sending station 2. The structure and content of the call data records 10a, 10b from the sending 2 and answering station 3 are identical. As with the sending station 2, the answering station 3 also transmits its call data records 10b to the management system 1 during review pauses (which are centrally predefined by the management system). The data transfer takes place like that of the sending station 2, e.g., via the telecommunication network 4 being reviewed (e.g., GSM) or via another network (e.g., ISDN).

At the management system 1, the call data records 10a, 10b are selected, matched and compared by an automated system, see Item 44.

In the simplest case this is performed in such a way that the data records are sorted by date and start time of the call. Data records in which this information matches, are subsequently compared regarding the telephone number of the sending/answering station contained therein.

If these also match, the remaining communication parameters are also compared for their identity. $CDR_S/CDR_A$ pairs that are one hundred percent identical are grouped together as reference data record pairs $CDR_S/CDR_A$ 25 and used for further billing certification (see FIG. 5). Call data records, which are not identical are sorted according to the data types:
  Individual $CDR_S$ or individual $CDR_A$ (26) and
  $CDR_{S/A}$ pair with different parameters (27) and routed to a further error analysis at the management system 1 (see FIG. 7 and FIG. 8).

Figure 5:
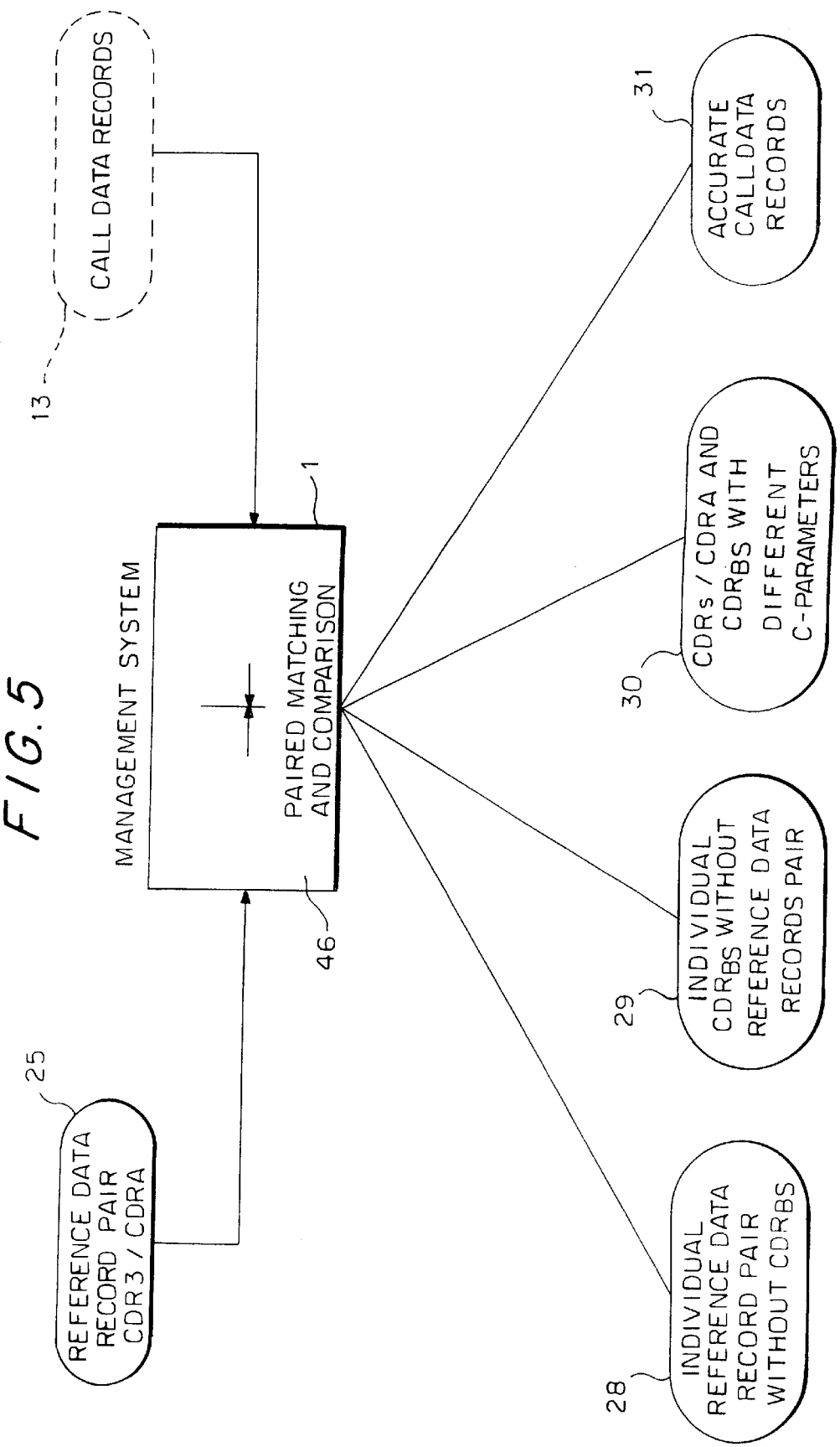
FIG. 5 shows the verification of the call data records of the telecommunication network's billing system.

FIG. 5 shows the verification of the call data records 13 of the telecommunication network 4 being reviewed, for example from its billing system, based on the generated reference data record pairs 25 from the review system.

The call data records 13 of the billing system $CDR_{BS}$ for the connections established by the sending-answering station 2,3 via the TC system 4, are supplied to the management system 1, for example by data transfer via ISDN. The call data records 13 ($CDR_{BS}$) in essence comprise the following parameters: telephone number of the sending station, telephone number of the answering station/destination telephone number, date, start time and duration of the communication, and communications service; TC-specific information (e.g., TC network identification, etc.) may optionally be included as well.

The automatic selection, matching and comparison (Item 46) of the $CDR_{BS}$ 13 with the $CDR_{S/A}$ reference data record pairs 25 takes place according to the same principle as the illustration of the reference data record pairs (see FIG. 4).

If the $CDR_{BS}$ 13 are one hundred percent identical with the $CDR_S/CDR_A$ reference data record pairs 25, it has been demonstrated that the TC system 4 has correctly created the billing-relevant communication data in the network facilities and has also correctly supplied these communication data to the billing system 7. These data records are saved in the "Good CDR File" 31 as "correct call data records" and routed to the subsequent "quality rating of the established communications connection" (see FIG. 6, Item 47).

Call data records that do not achieve complete identity or cannot be matched during the above review, are filed according to their review results as follows:
  Individual reference data record pairs $CDR_S/CDR_A$ without $CDR_{BS}$, (28)
  Individual $CDR_{BS}$ without pair of reference data records $CDR_S/CDR_A$, (29)
  $CDR_S/CDR_A$ and $CDR_{BS}$ with different C-parameters (30) and routed to an error analysis 45 (see FIG. 7 and 8).

Figure 6:
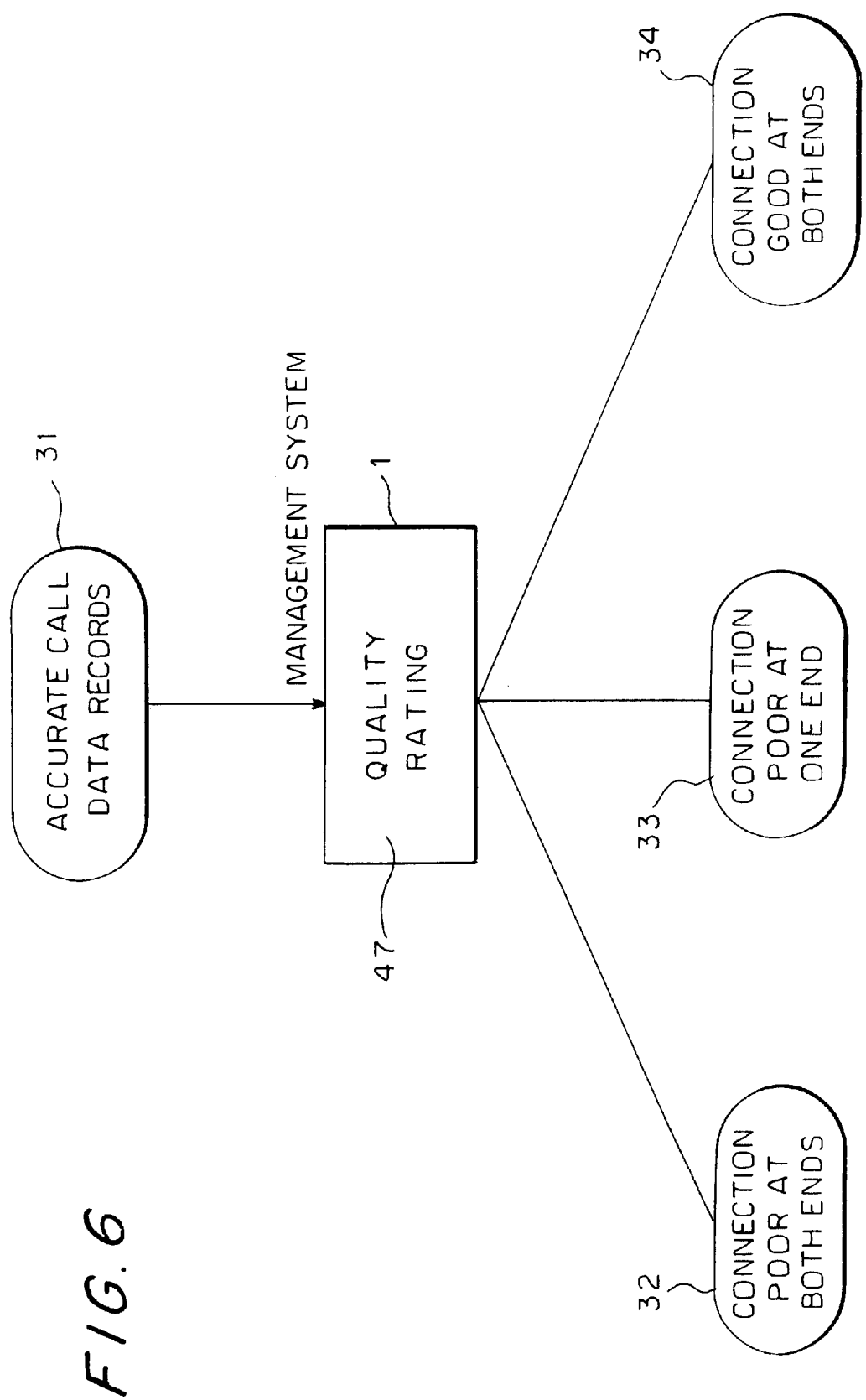
FIG. 6 illustrates the quality rating of the usage of the telecommunication connection.

FIG. 6 shows the quality rating of the accurate call data records 31. For this purpose the accurate call data records from the "Good $CDR_S$ File" 31 are evaluated at the management system 1 regarding the Q-parameter contained in the $CDR_S$ 10a and $CDR_A$ 10b.

During the established communications connection between the sending and answering station 2,3, review information according to the review mode defined in the job file 9 is transmitted by both stations to the respective opposite station, where it is are evaluated and the result is filed as the Q-parameter in the $CDR_S$ 10a or $CDR_A$ 10b, as well as in very detailed form in the review information log file 12 (RILF).

The review mode contains, among others, information regarding:
  Opposite station an answering station/ a free destination
  Transmit/receive and evaluate review information
  Type of connection release (by sending/answering station)
  Type of review information (e.g., FSK-modulated continuous signal).

The evaluation of the reception of the review information (e.g., FSK-modulated continuous signal) is written to the review log file 12; in the simplest case this is information like:
  Time when review signal is present
  Time when review signal was interrupted
  Time when review signal returned etc., until the connection is established.

Figure 7:
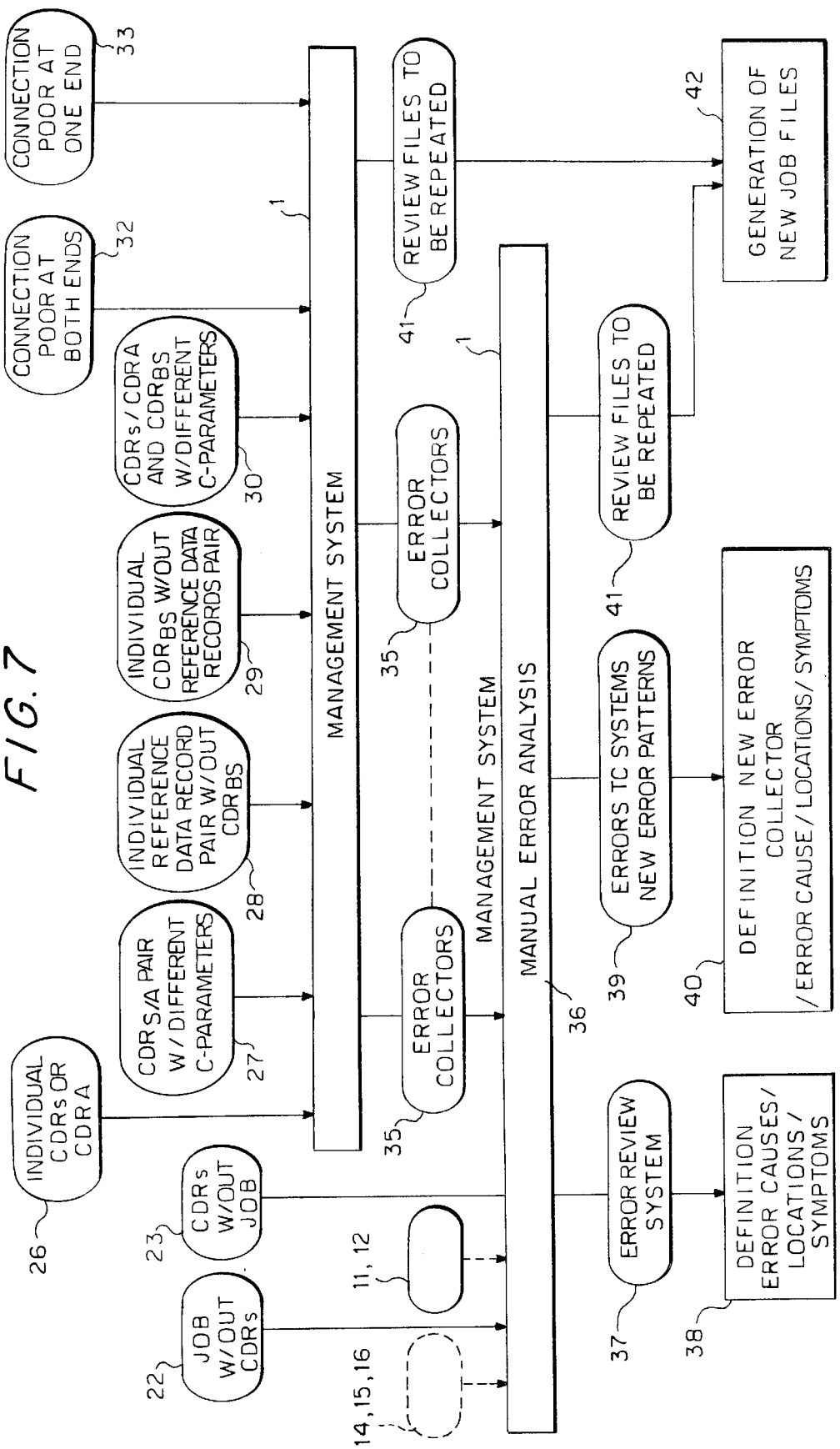
FIG. 7 shows the analysis of the defective or incomplete call data records.

The review information file 12 is analyzed during the error analysis (see FIGS. 7 and 8). From the events registered in this manner during the connection, the Q-parameter is determined from:

number of interruptions, effective utilization time vs. communication time reason for termination/release of the connection number of handovers, etc.

Based on the evaluation of the Q-parameter in the call data record 10a,10b from the sending 2 as well as from the answering station 3, the management system 1 makes a statement regarding the usage of the communications connection.

Accurate call data records from the "Good CDR File" 31, for which the Q-parameters, and thus the connection itself, were rated as "good" by both stations, are saved in the "Good Connections File" 34.

switching-center data records with a Q-rating

"Connection poor at both ends (S+A)", or

"Connection poor at one end (S or A) are saved in the appropriate files (32,33) and routed to an error analysis (see FIGS. 7 and 8).

FIG. 7 shows the structure of the analysis of the defective or incomplete call data records in an overview.

At the management system 1 the call data records from the following files are subjected to an automatic preliminary error analysis:

Individual $CDR_S$ or individual $CDR_A$ (26)

$CDR_{S/A}$ pair with different C-parameters (27)

Individual reference data record pair $CDR_S/CDR_A$ without $CDR_{BS}$ (28)

Individual $CDR_{BS}$ without reference data record pair $CDR_S/CDR_A$ (29)

$CDR_S/CDR_A$ and $CDR_{BS}$ with different C-parameters (30)

Connection poor at both ends (S+A) (32)

Connection poor at one end (S+A) (33).

During this process, the data records 26–30, 32,33 are sorted into error collectors 35 according to predefined error patterns (e.g., $CDR_{S/A}$ pair with certain identical C-parameter mismatches) or "unknown" error patterns, with the error collectors resulting in a repetition of this type of review file.

In a second step, the CDR from the error collectors 35 are routed to a manual error analysis 36 by an operator. During this process, the signaling and review information log files 11, 12 from the sending and answering station 2,3 corresponding to the CDR are called up by the management system 1. Furthermore, the management system 1 will be provided with data from the reviewed TC system 4 (such as connection and call data records 14, 15 (structure and content comparable to the $CDR_{BS}$) or also routing information 16 (routing tables), e.g., line path routing information, zoning/tax metering parameters, etc.), which permit a more precise error analysis.

With the manual error analysis, errors in the TC system 4 or in the review system, such as causes/locations/symptoms of errors are recognized.

Furthermore, new error patterns 39 are determined, based on which new error collectors 40 are established. In the simplest case, new review files 42 are generated from defective or incomplete CDR or jobs without CDR.

FIG. 8 shows the process principle of the quality review of the call data records. Proceeding from the job file 9, the predefined established communications connections 43 are executed by the review system via the telecommunication system 4 being reviewed. In the process, call data records 10a,10b, 13 are generated at the sending/answering station 2,3 of the review system ($CDR_S/CDR_A$), as well as in the TC system 4 ($CDR_{BS}$). The first step in the review is the index verification 21, whereby a search is conducted for the call data record 10a from the sending station ($CDR_S$) that matches the index defined in the job file 9. Only $CDR_S$, to which a job can conclusively be matched (same index) are used further during review step 2. All other job files 9 or $CDR_S$ 10a are saved in files 22, 23 for error analysis.

During review step 2, the reference data record pairs 25 are formed. From the $CDR_S$ 10a according to the job and the $CDR_A$ 10b, only those CDR are determined, which can be matched conclusively and whose communication parameters are identical. $CDR_S$ and $CDR_A$ that do not match are again saved in files 26, 27 and subjected to a detailed error analysis.

Those reference data record pairs 25 ($CDR_S/CDR_A$), which are one hundred percent identical are now routed to the third review step as reference base and verified based on the reference data record pairs 13 from the telecommunication network 4 (e.g., from the TC billing system). Again, only those $CDR_S$ triples 31 from the reference data record pair $CDR_S/CDR_A$ and $CDR_{BS}$ are routed to the next review step that can be matched conclusively and are 100% identical in their C-parameters; all other CDR are again saved in files 28, 29, 30 and routed to a detailed error analysis.

The final review step focusses on the evaluation of the actual use of the communications connection. The reference data record pairs 25 ($CDR_S/CDR_A$), for which call data records 13 were also created in the TC system 4, which are present in the TC billing system, and which are 100% identical in all billing-relevant communication parameters, are now examined regarding the effective usability during the entire connection time.

For this purpose the Q-parameter of the $CDR_S$ 10a and $CDR_A$ 10b is evaluated. The Q-parameter is a measure for the availability and the quality of the connection. Only if both Q-parameters (from $CDR_S$ and $CDR_A$) receive the rating "good", is the CDR-triple 31 saved in a "Good Connection File". All other CDR triples 31 are saved in files 32 33 and routed to the detailed error analysis.

To support and optimize the error analysis 45, additional data or files are called up from the reviewed TC system 4 and the sending/answering station 2,3 as needed. For the TC system these are, among others, connection/call data records 14, 15 or routing information 16 from various private telecommunication switching systems 5. From the sending/answering station 2,3 these are the signaling and review log files 11, 12.

The result of the error analysis is the definition of new error collectors 40 based on the recognized error patterns 39;

definition of the cause/location/symptoms of the errors in the TC system 4 or review system that have resulted in the defective, incomplete or missing CDR; and the generation of new job files 42 based on the selected call data records.

In conclusion, various quality reports and statistics 48 are prepared from the job file 42, from the accurate call data records from the "Good CDR File" 31 and from the "Good Connection File" 34, as well as from the CDR 37, 39 that was analyzed for errors.

Drawing Legend

1 Management system

2 Sending station

3 Answering station
4 Telecommunication system
5 Private telecommunication switching system
6 Routing tables
7 Billing system BS
8 Review file
9 Job file
10 Call data records 10a, 10b
11 Signaling log files 11a,11b
12 Review information log files 12a,12b
13 Call data records (BS)
14 Call data records (TC system)
15 Connection data records (TC system)
16 Routing logs (TC system)
17 Time signaling device
18 Statistical selection process (TC system
19 Representative concentrate from the CDR
20 Generation of review files/job files
21 Index review
22 Job without $CDR_S$
23 $CDR_S$ without job
24 $CDR_S$ according to job
25 Reference data record pair $CDR_S/CDR_A$
26 Individual $CDR_S$ or $CDR_A$
27 $CDR_{S/A}$ pair with different C-parameters
28 Individual reference data record pair $CDR_S/CDR_A$ without $CDR_{BS}$
29 Individual $CDR_{BS}$ without reference data record pair $CDR_S/CDR_A$
30 $CDR_S/CDR_A$ and $CDR_{BS}$ with different C-parameters
31 Accurate call data records
32 Connection poor at both ends (S+A)
33 Connection poor at one end (S or A)
34 Connection good at both ends (S+A)
35 Error collector
36 Manual error analysis
37 Error review system
38 Definition error causes/locations/symptoms of the review system
39 Error TC systems, new error patterns
40 Definition new error collector/error cause/location/symptoms of the TC systems
41 Review files to be repeated
42 Generation of new job files
43 Processing of the communications connection
44 Paired matching and comparison
45 Automatic/manual error analysis
46 Paired matching and comparison
47 Quality rating
48 Quality report and statistics

We claim:

1. A method for checking a telecommunication system (4) with respect to an accurate routine detection of system-internal call data records (13, 14), characterized in that
    a) various communications connections are established and later terminated between two subscriber stations (2,3) via the telecommunication system (4) on the basis of predefined communication parameters; that
    b) further call data records (10a, 10b) are independently prepared and saved from these communications connections at both of these subscriber stations (2,3); and that
    c) the system-internal call data records (101013) for said communications connections that are routinely created by the telecommunications system (4) itself, are compared to the further call data records (10a, 10b).

2. A method according to claim 1, characterized in that the subscriber stations include a sending station (2) and an answering station (3), the system-internal call data records (13) are a series of statistically selected, customer-generated, anonymized call data records (13) that are transmitted to a management system (1) of a review system, where the system-internal data records are processed in such a way that a statistically representative review file (8) resembling customer behavior, which comprises one or a plurality of communications jobs, is generated from the system-internal call data records (13), and said review file (8) is transmitted as a job file (9) to the sending station (2), where the job file is processed in such a way that the sending station (2) establishes the connections specified in the job file (9) to the answering station (3) via the telecommunication system (4).

3. A method according to claim 1, characterized in that the subscriber stations include a sending station (2) and an answering station (3), an operating-company oriented review file (8), comprising one or more communications jobs, is generated, which contains selected review scenarios, with the review file (8) being transmitted to the sending subscriber station (2) as a job file (9), where the review file is processed in such a way that the sending station establishes connections as they are predefined by the job file (9) via the telecommunication system (4) to be reviewed to the answering station (3) or a freely determinable destination telephone number.

4. A method according to claim 2, characterized in that the subscriber stations include a sending station (2) and an answering station (3), both at the sending station (2) and at the answering station (3), a further call data record (10a,10b) is created from each connection and each attempted connection, the further call data record is transmitted to the management system (1) where it is saved in such a way that further call data records (10a) from the sending station (2) and job files (9) are matched by means of an index review (21), and further call data records (10a) or job files (9) which cannot be conclusively matched, or which are not identical, are collected in further files (22, 23) for further review.

5. A method according to claim 1, characterized in that the subscriber stations include a sending station (2) and an answering station (3), further call data records (10a) from the sending station (2) with job files (9) that can be matched conclusively and further call data records (10b) from the answering station (3) are matched, and their communication parameters are compared (44), and incomplete or defective further call data records (10a,10b) or further call data records (10a,10b) that cannot be matched, are collected in first additional files (26, 27) for further analysis.

6. A method according to claim 1, characterized in that the subscriber stations include a sending station (2) and an answering station (3), the further call data records (10a,10b) from the sending and answering stations (2,3) which can be conclusively matched and have identical communication parameters are grouped into reference data record pairs (25) and used for the verification of the call data records (13) generated in the telecommunication system (4) in such a way that the system-internal call data records (13) from the telecommunication system (4) are matched to the reference data record pairs (25) and their communication parameters are compared, and data records which cannot be conclusively matched, or which are not identical, are collected in second additional files (28–30) for further analysis.

7. A method according to claim 1, characterized in that the subscriber stations include a sending station (2) and an answering station (3), signaling data, which are exchanged for set-up, maintaining and termination of a connection between the sending station and the answering station (2,3) and the telecommunication system (4) are recorded in log files (11a, 11b) at the sending station, and at the answering station (2,3) and transmitted to a management system (1), either automatically or upon request.

8. A method according to claim 1, characterized in that communications information, connecting data and routing information saved in the telecommunication system (4) are transmitted to a management system (1) either automatically or upon request.

9. A method according to claim 1, characterized in that the subscriber stations include a sending station (2) and an answering station (3), after a connection has been set up between the sending station (2) and the answering station (3), predefined review information is transmitted and transmission events are recorded at the respective opposite station in review information log files (12a, 12b) and transmitted to a management system (1), either automatically or upon request.

10. A method according to claim 9, characterized in that quality parameters are created at the sending station (2) and at the answering station (3) from the events of the transmission of the received review information (12a, 12b), which quality parameters are incorporated into the corresponding further call data records (10a,10b) of the sending station and answering station, and transmitted to the management system along with said further call data records.

11. A method according to claim 1, characterized in that the subscriber stations include a sending station (2) and an answering station (3), reference data record pairs (25) that can be conclusively matched to the system-internal call data records (13) of the telecommunication system (4), and which are identical in their communication parameters, are subjected to a quality rating (47) in such a way that the quality parameters of the individual further call data record (10a,10b) of the sending and answering stations are rated, and only reference data record pairs with two individual ratings of "good" are saved in a "Good Connection File" (34), whereas reference data records with one or no individual rating of "good" are collected in other files (32,33) for further analysis.

12. A method according to claim 1, characterized in that incomplete or defective or not matchable or not identical further call data records collected in files for further evaluation, are subjected to a first automatic preliminary error analysis at a management system (1) in such a way that further call data records with identical error patterns or unknown error pattern are collected in defined error collectors (35) for further analysis.

13. A method according to claim 12, characterized in that further call data records that cannot be matched or that are not identical, which are collected in files for further evaluation, and the further call data records from the error collectors (35) are compared during a manual error analysis (36) to corresponding signaling and review log files (11, 12) and to communications and connection data records (14,15) and to routing information (16) generated in the telecommunication system, and analyzed.

14. A method according to claim 1, characterized in that further call data records are selected during automatic preliminary error analysis, as well as during manual error analysis, from which new job files (42) are generated, which, in the simplest case, contain a repetition of the communication that has resulted in an error.

15. A method according to claim 1, characterized in that after the first determination of a cause for a defective further call data record, a new error pattern (39) and, hence, a new error collector (40) are defined and established at a management system.

16. A method according to claim 12, characterized in that the defined error collectors are statistically evaluated to determine changes in the quality of the telecommunication system.

17. A method according to claim 1, characterized in that the subscriber stations include a sending station (2) and an answering station (3), the further call data records (10a,10b) preferably contain the following connection-relevant parameters: telephone number of the sending and answering stations, date, start time/end time or duration of the communication, and communications service.

18. A method according to claim 1, characterized in that review of the system-internal call data records (13) takes place during the regular operation of the telecommunication system (4).

19. A method according to claim 2, characterized in that the review file (8) is repeated in intervals that can be determined freely, and generated automatically or manually with any chosen definition.

20. A method according to claim 1, characterized in that the subscriber stations include a sending station (2) and an answering station (3), the transmission of the system-internal and further call data records (10,13), logs and files between a management system (1), network devices/network elements, a billing center (7), the sending station (2) and the answering station (3) takes place via the telecommunication system (4) or via an additional telecommunication system.

21. A method according to claim 2, characterized in that one or several mobile or stationary stations are managed by the management system (1) and that it is determined at the management system when and which mobile or stationary station works as a sending or answering station (2,3), and with which opposite station it communicates.

22. A method according to claim 1, characterized in that the subscriber stations include a sending station (2) and an answering station (3), and the sending and answering stations (2,3) are synchronized by means of a time signaling device (17).

23. A device to perform the method according to claim 1, characterized by: a management system (1) having a system for saving and processing data, generating review/job files (8,9), and an interface for data communication with end units and, optionally, devices that are compatible with the telecommunication system (4); at least one sending station (2) and an answering station (3), each with at least one telecommunication end unit, a unit for saving and processing data and controlling the telecommunication end unit, a time signaling device (17), and a data interface for the communication with the management system (1).

24. A device according to claim 23, characterized in that the sending station and/or answering station (2,3) may, optionally, be mobile or stationary stations.

* * * * *